United States Patent
Schlomer

(10) Patent No.: US 7,539,305 B2
(45) Date of Patent: May 26, 2009

(54) SCHRYPTION METHOD AND DEVICE

(75) Inventor: Todd B. Schlomer, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 869 days.

(21) Appl. No.: 10/794,149

(22) Filed: Mar. 5, 2004

(65) Prior Publication Data
US 2009/0110193 A1   Apr. 30, 2009

(51) Int. Cl.
*H04L 9/28* (2006.01)
(52) U.S. Cl. .......................................... 380/28
(58) Field of Classification Search ............... 380/28
See application file for complete search history.

(56) References Cited

U.S. PATENT DOCUMENTS

| | | | |
|---|---|---|---|
| 3,798,360 A | 3/1974 | Feistel | |
| 5,003,596 A * | 3/1991 | Wood | 380/28 |
| 5,548,648 A | 8/1996 | Yorke-Smith | |
| 5,805,705 A | 9/1998 | Gray et al. | |
| 6,192,129 B1 | 2/2001 | Coppersmith et al. | |
| 6,363,148 B1 | 3/2002 | Sako | |
| 6,490,353 B1 | 12/2002 | Tan | |
| 2002/0159598 A1 | 10/2002 | Rubinstein et al. | |

FOREIGN PATENT DOCUMENTS

WO   WO 01/01223 A1   1/2001

* cited by examiner

*Primary Examiner*—Gilberto Barron, Jr.
*Assistant Examiner*—Devin Almeida
(74) *Attorney, Agent, or Firm*—Kunzler & McKenzie

(57) ABSTRACT

A schryption of a text message is based on a schryption key for defining one or more aspects of an encryption and/or a decryption of the text message. For an encryption of the text message, the schryption key is derived from a user key in the form of an encryption key (e.g., a secret key or a public key), and the text message in the form of plaintext is encrypted as defined, at least partially, by the schryption key to thereby yield a ciphertext. For a decryption of the text message, the schryption key is derived from user key in the form of a decryption key (e.g., a secret key or a private key), and the text message in the form of a ciphertext is decrypted as defined, at least partially, by the schryption key to thereby yield a plaintext.

3 Claims, 9 Drawing Sheets

SCHRYPTION METHOD AND DEVICE

FIELD OF INVENTION

The present invention generally relates to cryptography and cryptanalysis. The present invention specifically relates to dynamic key-based cipher methods for minimizing, if not eliminating, successful retrieval by cryptanalysts of plaintext from ciphertext.

BACKGROUND OF THE INVENTION

Cryptography involves an encryption process for encoding the contents of a plaintext on a stream, block or unit basis to yield a ciphertext that conceals the contents of the plaintext, and a decryption process for decoding the ciphertext on a stream, block or unit basis to retrieve the contents of the plaintext. The method of encryption and decryption is called a cipher, which typically use one or more keys to control the encryption of the plaintext and the decryption of the ciphertext. There are threes (3) classes of key-based cipher methods.

The first class is symmetric key-based cipher methods that are based on using a secret key or a key randomly derived from the secret key for both encryption and decryption, or using the secret key or the key randomly derived from the secret key for both encryption only while deriving the decryption key from the encryption key. Some well known symmetric key-based cipher methods are Data Encryption Standard ("DES"), Advanced Encryption Standard ("AES"), the One-Time Pad ("OTP"), Blowfish, IDEA and RC4.

The second class is asymmetric key-based cipher methods that are based on using a different key for encryption and decryption where the decryption key (a.k.a. the "private key") cannot be derived from the encryption key (a.k.a. the "public key)". Some well known asymmetric key-based cipher methods are Rivest-Shamir-Adleman ("RSA") and Rabin.

The third class is hybrid key-based cipher methods that are based on using an asymmetric public-key to derive a symmetric key for both encryption and decryption, or a symmetric key for encryption while deriving the decryption key from the symmetric key.

Cryptanalysis involves a decoding, without any knowledge of the appropriate key(s), of a ciphertext on a stream basis or a block basis to retrieve the contents of a corresponding plaintext. Some well known cryptanalysis techniques are brute force attacks, ciphertext-only attacks, known-plaintext attacks, chosen-plaintext attacks, man-in-the-middle attacks, key-output correlation attacks, attacks against the underlying hardware, and attacks using faults in the underlying software and/or hardware.

Cryptography deals with all aspects of secure messaging, authentication, digital signatures, electronic money, and other well-known applications. Furthermore, most cryptographic algorithms are designed to be executed by computers and by specialized hardware devices. Thus, the computer industry is continually striving to design computer software and specialized hardware devices that minimize, if not eliminate, any cryptanalysis attack on the computer software and/or its underlying computer hardware, and on specialized hardware devices.

SUMMARY OF THE INVENTION

The present invention provides a new and unique key-based cipher method known herein as "schryption" that minimizes, if not eliminates, any cryptanalysis attack on computer software and/or its underlying computer hardware for implementing the key-based cipher method, and specialized hardware devices for implementing the key-based cipher method.

One form of the present invention is a schryption method for ciphering a text message that involves (1) a reception of the text message and a user key, (2) a derivation of a schryption key from the user key where the schryption key defines one or more aspects of a ciphering of the text message, and (3) a ciphering of the text message as defined, at least partially, by the schryption key to thereby yield a ciphered text message.

A second form of the present invention is a signal bearing medium tangibly embodying a program of machine-readable instructions executable by a processor to perform operations to cipher a text message, the operations involving (1) a reception of the text message and a user key, (2) a derivation of a schryption key from the user key where the schryption key defines one or more aspects of a ciphering of the text message, and (3) a ciphering of the text message as defined, at least partially, by the schryption key to thereby yield a ciphered text message.

A third form of the present invention is device employing a processor, and a memory storing instructions operable with the processor for ciphering a text message, the instructions being executed for (1) receiving the text message and a user key, (2) deriving a schryption key from the user key where the schryption key defines one or more aspects of a ciphering of the text message, and (3) ciphering the text message as defined, at least partially, by the schryption key to thereby yield a ciphered text message.

The terms "text message", "plaintext" and "ciphertext" shall encompass any and every type of data, including, but not limited to, plain data strings, emails, files and otherwise other communications involving well known applications, such as, for example, secure messaging, authentication, digital signatures and electronic money.

The forgoing forms and other forms, objects, and aspects as well as features and advantages of the present invention will become further apparent from the following detailed description of the presently preferred embodiments, read in conjunction with the accompanying drawings. The detailed description and drawings are merely illustrative of the present invention rather than limiting the scope of the present invention being defined by the appended claims and equivalents thereof.

DESCRIPTION OF THE PREFERRED EMBODIMENT

Figure 3:
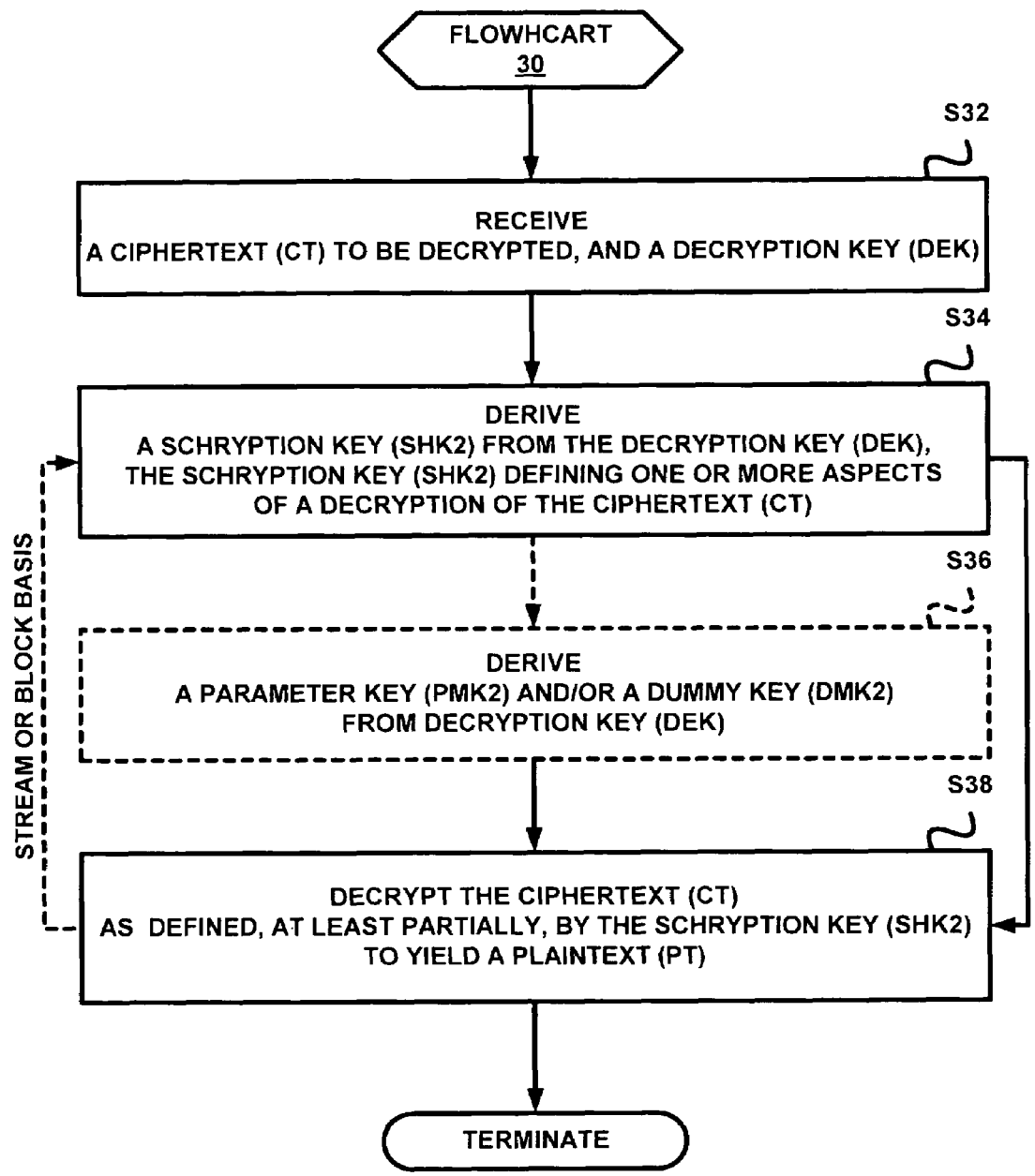
FIG. 3 illustrates a flowchart representative of schryption method in accordance with a decryption embodiment of the present invention.
Figure 5:
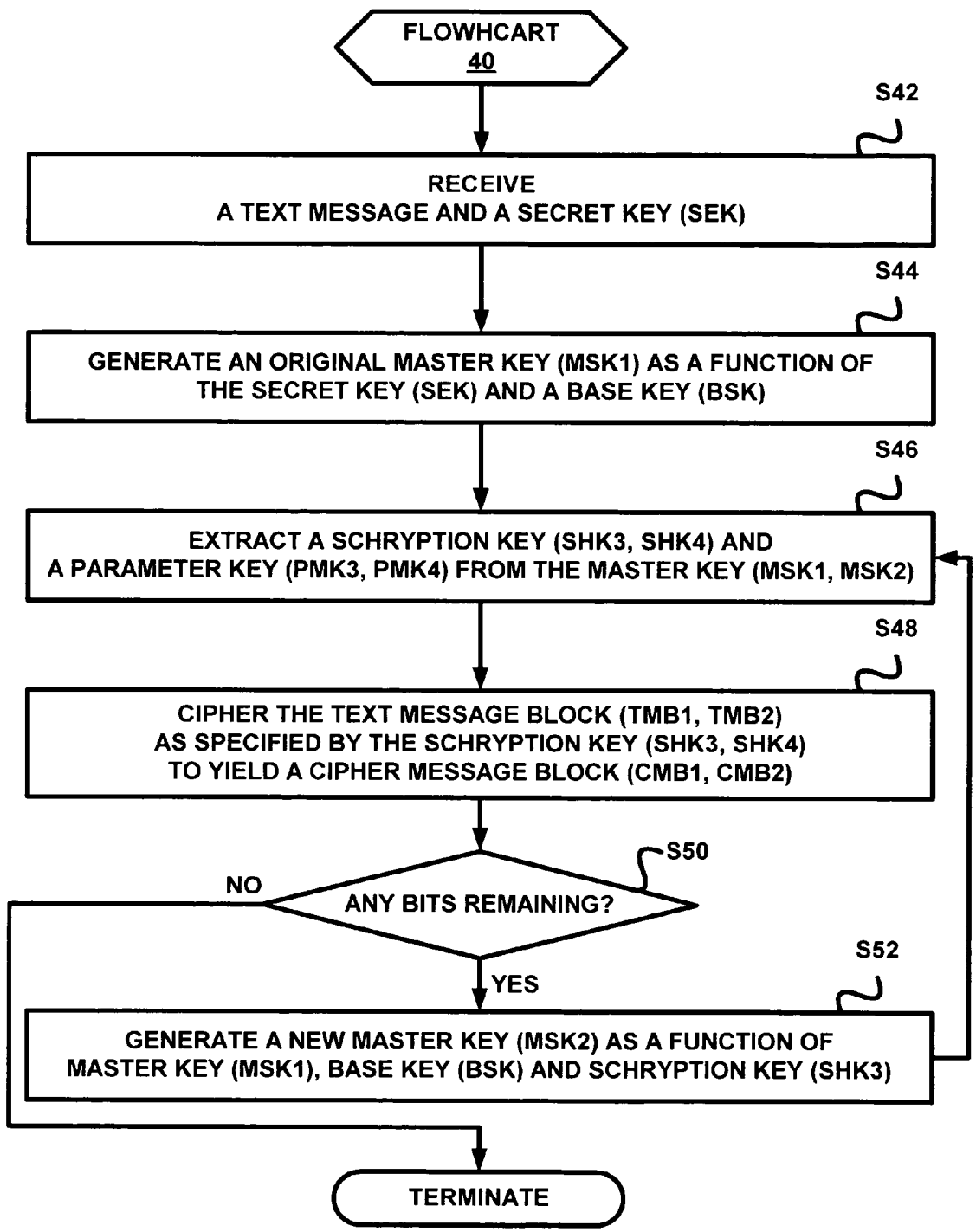
FIG. 5 illustrates a flowchart representative of schryption method in accordance with a total schryption embodiment of the present invention.

Schryption encompasses a key-based cipher method involving a dynamic generation of schryption keys, on a stream, block or unit basis, from a cipher key in the form of either an encryption key or a decryption key, where the cipher key is associated with a symmetric implementation of the cipher method (e.g., a secret key) or an asymmetric implementation of the cipher method (e.g., a public key or a private key). Each generated schryption key defines one or more aspects of an encryption of a plaintext, and/or a decryption of a ciphertext. To facilitate an understanding of the present invention, FIG. 1 illustrates a flowchart 20 representative of a baseline schryption method for encrypting a plaintext, FIG. 3 illustrates a flowchart 30 representative of a baseline schryption method for decrypting a ciphertext, and FIG. 5 illustrates a flowchart 50 representative of a total schryption method for encrypting and decrypting a text message in the form of a plaintext or a ciphertext.

Figure 1:
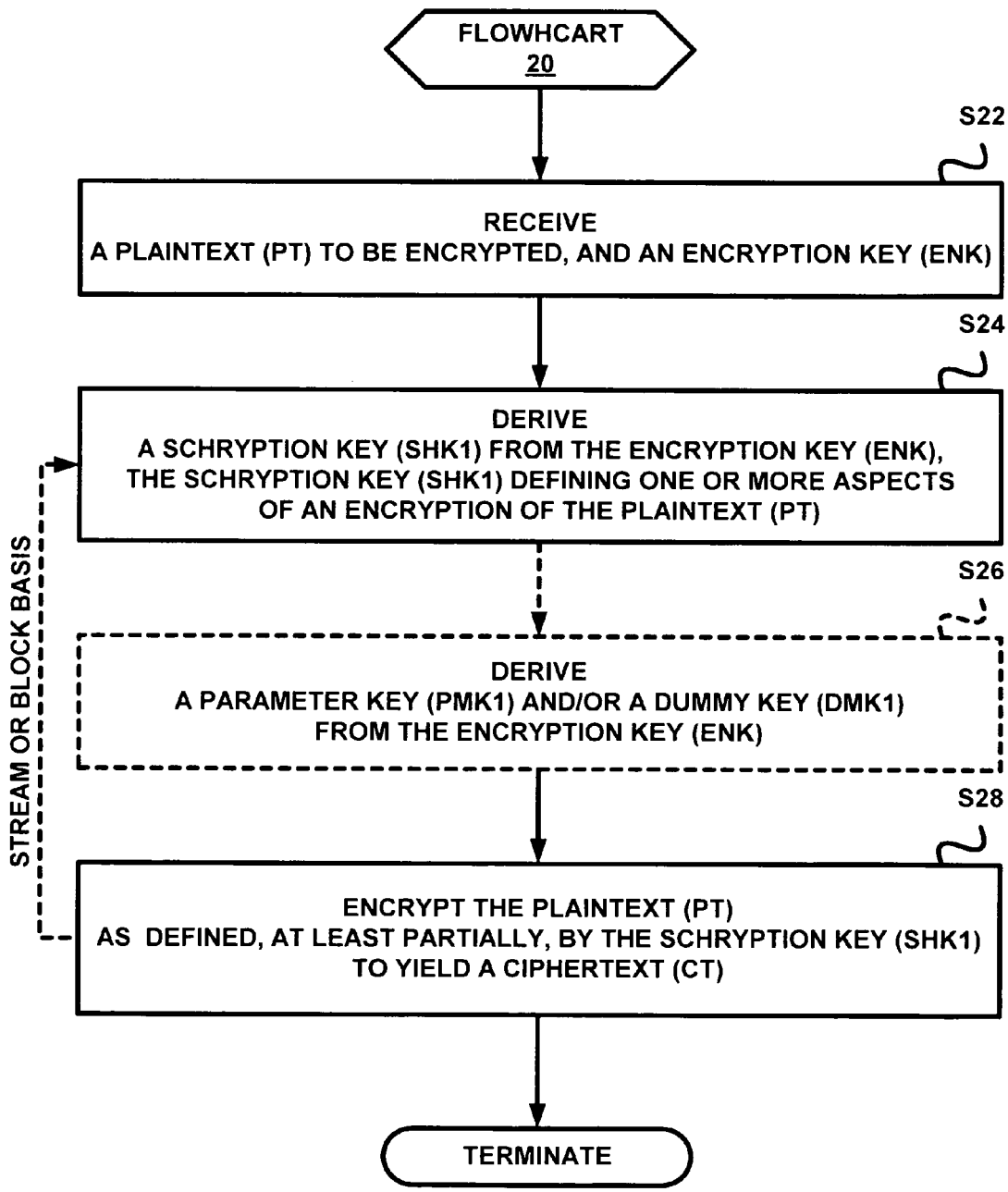
FIG. 1 illustrates a flowchart representative of schryption method in accordance with an encryption embodiment of the present invention.
Figure 2:
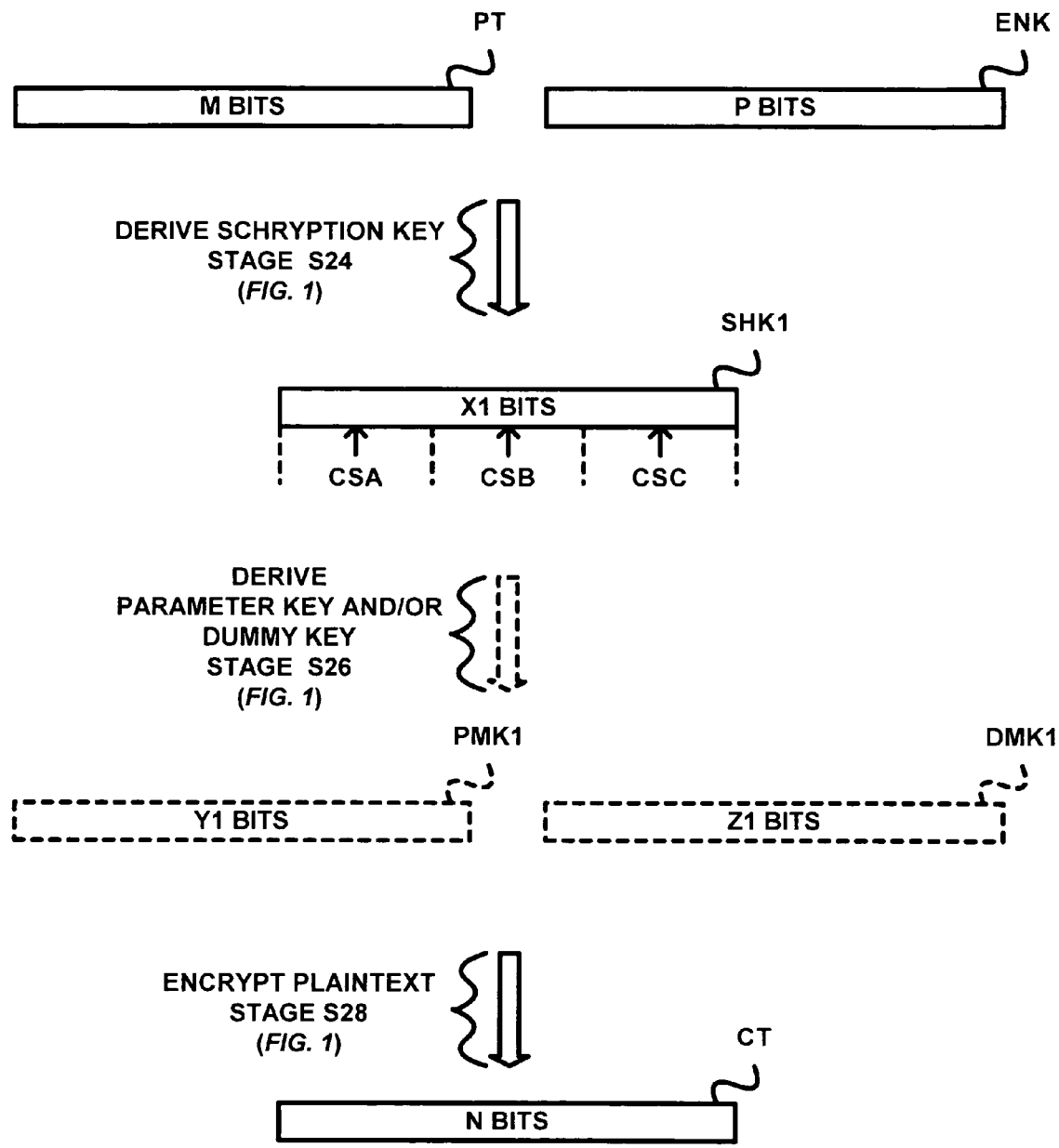
FIG. 2 illustrates an exemplary generation of various keys during an execution of the flowchart illustrated in FIG. 1.

Referring to FIG. 1, during a stage S22 of flowchart 20 and as exemplary illustrated in FIG. 2, a text message in the form of a plaintext PT of M bits to be encrypted, where M>1, and a user key in the form of an encryption key ENK of P bits, where P>1, are received. In practice, plaintext PT can be a confidential text message or be a confidential portion of an otherwise non-confidential text message. Also in practice, the actual form of encryption key ENK is without limit, and is therefore not a limitation as to the scope of stage S22.

In one exemplary embodiment of stage S22, encryption key ENK is in the conventional form of a secret key.

In a second exemplary embodiment of stage S22, encryption key ENK is in the conventional form of a public key.

During a stage S24 of flowchart 20, a schryption key SHK1 of X1 bits as exemplary illustrated in FIG. 2, where X1>1, is derived from encryption key ENK. The bit(s) in schryption key SHK1 will define one or more aspects of the encryption of plaintext PT, such as, for example, (1) how to encrypt plaintext PT, (2) operations to perform in order to facilitate an encryption of plaintext PT, (3) which encryption functions (e.g., Boolean functions, DES, AES, RSA, etc.) to perform in order to encrypt plaintext PT, (4) how many times to perform each encryption function, and (5) how to derive additional schryption keys for encrypting any remaining portion of plaintext PT. Aspects of the encryption of plaintext PT that are not defined by schryption key SHK1 can be predetermined or dynamically generated by other techniques as known in the art, such as, for example, a software routine embodying flowchart 20 can have computer readable code for calling one or more Boolean functions of a processor (e.g., AND, OR, XOR, NAND, etc.) or calling an external encryption function (e.g., DES, AES, RSA, and user-defined function) that serve as the encryption function.

In one exemplary embodiment, schryption key SHK1 will include one or more control segments, each having one or more bits, for defining one or more aspects of an encryption of plaintext PT. The following TABLE 1 lists exemplary control segments CSA-CSC as exemplary illustrated in FIG. 2:

TABLE 1

| CONTROL SEGMENT | PURPOSE |
|---|---|
| CSA | SPECIFIES AN ENCRYPTION FUNCTION TO BE EXECUTED |
| CSB | SPECIFIES THE NUMBER OF TIMES THE ENCRYPTION FUNCTION IS TO BE EXECUTED |
| CSC | SPECIFIES THE NUMBER OF BITS OF PLAINTEXT (PT) TO BE PROCESSED BY THE ENCRYPTION FUNCTION |

In practice, the types of techniques in which schryption key SHK1 can be derived from encryption key ENK are without limit, and is therefore not a limitation as to the scope of stage S24.

In one exemplary embodiment of stage S24, encryption key ENK and schryption key SHK1 have a pre-defined correlation whereby, conventional or otherwise, based on the pre-defined correlation between encryption key ENK and schryption key SHK1, a technique can be implemented to derive schryption key SHK1 from encryption key ENK. For example, a particular bit or bits within encryption key ENK can be pre-defined to indicate a selection of schryption SHK1 from a plurality of pre-determined schryption keys.

In a second exemplary embodiment of stage S24, encryption key ENK can serve as a parameter within an execution of a technique, conventional or otherwise, for deriving schryption key SHK1 as a function of encryption key ENK. For example, encryption key ENK can serve as a parameter within an execution of a mathematical and/or logical algorithm whereby the result is schryption key SHK1.

In a third exemplary embodiment of stage S24, encryption key ENK can serve as a parameter within an execution of a technique, conventional or otherwise, for deriving a master key as a function of encryption key ENK. For example, encryption key ENK can serve as a parameter within an execution of a mathematical algorithm and/or logical algorithm whereby the result is the master key, and schryption key SHK1 is extracted, conventionally or otherwise, from the master key.

During an optional stage S26 of flowchart 20, a parameter key PMK1 of Y1 bits as exemplary illustrated in FIG. 2, where Y1>1, and/or a dummy key DMK1 of Z1 bits as exemplary illustrated in FIG. 2, where Z1>1, are derived from encryption key ENK. As with schryption key SHK1, in practice, the types of techniques in which parameter key PMK1 and dummy key DMK1 can be derived from encryption key ENK are without limit, and is therefore not a limitation as to the scope of stage S26. In one exemplary embodiment, schryption key SHK1 specifies an extraction of parameter key PMK1 and dummy key DMK1 from a master key generated from encryption key ENK.

During a stage S28 of flowchart 20, plaintext PT is encrypted as defined, at least partially, by schryption key SHK1 to yield a ciphertext CT of N bits as exemplary illustrated in FIG. 2, where N>1. If stage S26 was executed prior to stage S28, then parameter key PMK1 serves as an encryption parameter during the encryption of plaintext PT during stage S28, and/or dummy key DMK1 is inserted within the resulting ciphertext CT, which can serve as a confidential text message or incorporated as a confidential portion of an otherwise non-confidential text message.

An encryption of the bits of plaintext PT during stage S28 can be accomplished either (1) on a stream basis involving an encryption of each bit of plaintext PT individually, (2) on a block basis involving individual encryption of bit blocks of plaintext PT of the same or variable lengths, or (3) on a unit basis involving a collective encryption of all of the bits of plaintext PT. When encryption of the bits of plaintext PT during stage S28 is accomplished on a unit basis, which may or may not be specified by schryption key SHK1, then flowchart 20 can be terminated upon completion of stage S28. When encryption of the bits of plaintext PT during stage S28 is accomplished on a stream or block basis, which may or may not be specified by schryption key SHK1, then flowchart 20 can be either (1) terminated upon completion of stage S28, in which each bit or bit block of plaintext PT may or may not have been encrypted in accordance with schryption key SHK1, or (2) returned to stage S24 for one or more rounds to thereby derive one or more additional schryption keys for encrypting some or all of the remaining bits or bit blocks of plaintext PT.

Irrespective of how flowchart 20 is terminated, those having ordinary skill in the art will appreciate the new and unique encryption security obtained in the concealment of the contents of plaintext PT within ciphertext CT.

Figure 4:
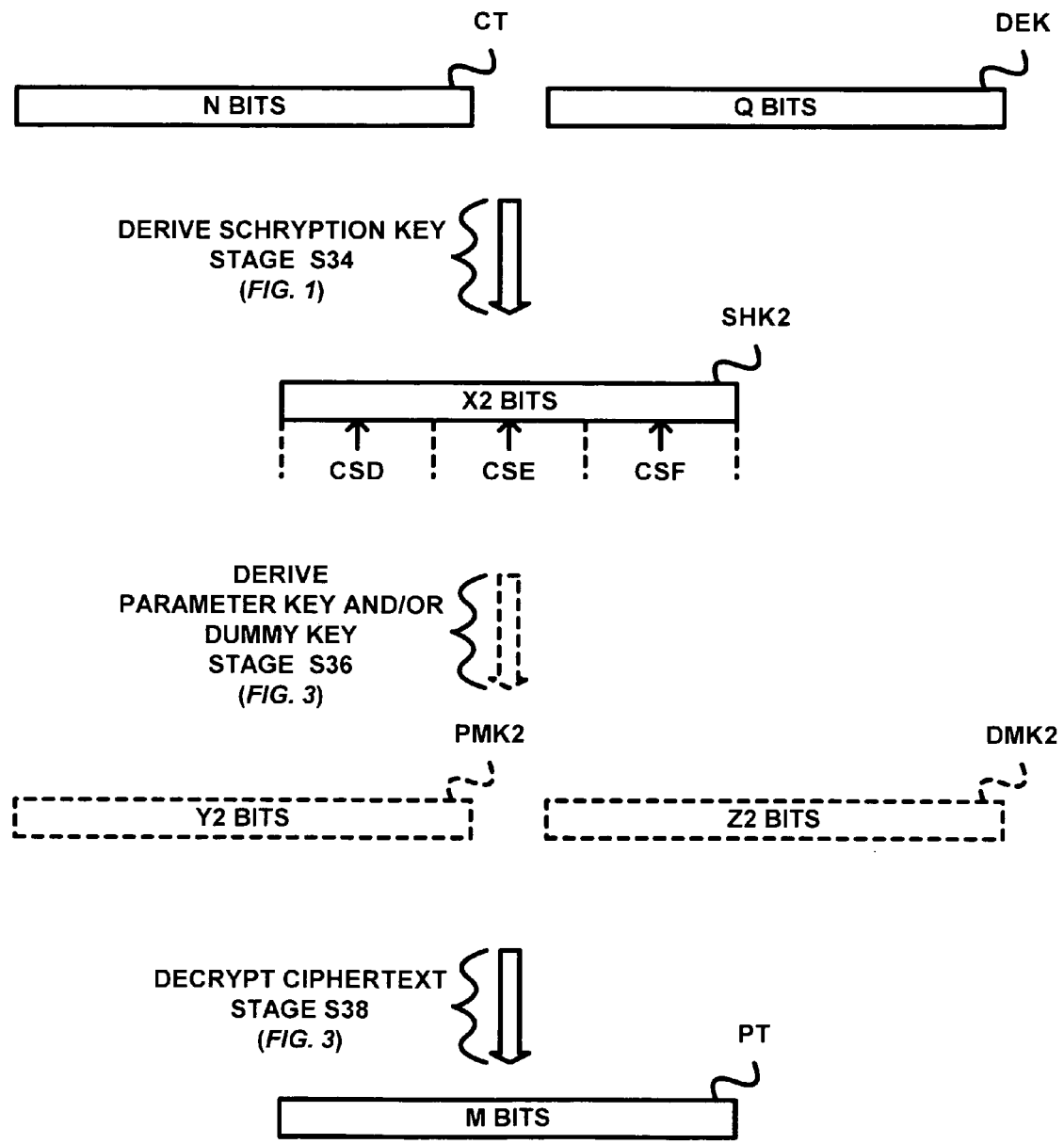
FIG. 4 illustrates an exemplary generation of various keys during an execution of the flowchart illustrated in FIG. 3.

Referring to FIG. 3, during a stage S32 of flowchart 30 and as exemplary illustrated in FIG. 4, a text message in the form of a ciphertext CT of N bits to be decrypted, where N>1, and a user key in the form of a decryption key DEK of Q bits, where Q>1, are received. In practice, ciphertext CT can be a confidential text message or be a confidential portion of an otherwise non-confidential text message. Also in practice, the actual form of decryption key DEK is without limit, and is therefore not a limitation as to the scope of stage S32.

In one exemplary embodiment of stage S32, decryption key DEK is in the conventional form of a secret key.

In a second exemplary embodiment of stage S32, decryption key DEK is in the conventional form of a private key.

During a stage S34 of flowchart 30, a schryption key SHK2 of X2 bits as exemplary illustrated in FIG. 4, where X2>1, is derived from decryption key DEK. The bit(s) in schryption key SHK2 will define one or more aspects of the decryption of ciphertext CT, such as, for example, (1) how to decrypt ciphertext CT, (2) operations to perform in order to facilitate a decryption of ciphertext CT, (3) which decryption functions (e.g., Boolean functions, DES, AES, RSA, etc.) to perform in order to decrypt the ciphertext CT, (4) how many times to perform each decryption function, and (5) how to derive additional schryption keys for decrypting any remaining portion of ciphertext CT. Aspects of the decryption of the ciphertext CT that are not defined by schryption key SHK2 can be predetermined or dynamically generated by other techniques as known in the art, such as, for example, a software routine embodying flowchart 30 can have computer readable code for calling one or more Boolean functions of a processor (e.g., AND, OR, XOR, NAND, etc.) or calling an external decryption function (e.g., DES, AES, RSA, and user-defined function) that serve as the decryption function.

In one exemplary embodiment, schryption key SHK2 will include one or more control segments, each having one or more bits, for defining, at least partially, a decryption of ciphertext CT. The following TABLE 2 lists exemplary control segments CSD-CSF as exemplary illustrated in FIG. 4:

TABLE 2

| CONTROL SEGMENT | PURPOSE |
| --- | --- |
| CSD | SPECIFIES A DECRYPTION FUNCTION TO BE EXECUTED |

TABLE 2-continued

| CONTROL SEGMENT | PURPOSE |
| --- | --- |
| CSE | SPECIFIES THE NUMBER OF TIMES THE DECRYPTION FUNCTION IS TO BE EXECUTED |
| CSF | SPECIFIES THE NUMBER OF BITS OF CIPHERTEXT (CT) TO BE PROCESSED BY THE DECRYPTION FUNCTION |

In practice, the types of techniques in which schryption key SHK2 can be derived from decryption key DEK are without limit, and is therefore not a limitation as to the scope of stage S34.

In one exemplary embodiment of stage S34, decryption key DEK and schryption key SHK2 have a pre-defined correlation whereby, conventional or otherwise, based on the pre-defined correlation between decryption key DEK and schryption key SHK2, a technique can be implemented to derive schryption key SHK2 from decryption key DEK. For example, a particular bit or bits within decryption key DEK can be pre-defined to indicate a selection of schryption SHK from a plurality of pre-determined schryption keys.

In a second exemplary embodiment of stage S34, decryption key DEK can serve as a parameter within an execution of a technique, conventional or otherwise, for deriving schryption key SHK2 as a function of decryption key DEK. For example, decryption key DEK can serve as a parameter within an execution of a mathematical and/or logical algorithm whereby the result is schryption key SHK2.

In a third exemplary embodiment of stage S34, decryption key DEK can serve as a parameter within an execution of a technique, conventional or otherwise, for deriving a master key as a function of decryption key DEK. For example, decryption key DEK can serve as a parameter within an execution of a mathematical algorithm and/or logical algorithm whereby the result is the master key, and schryption key SHK2 is extracted, conventionally or otherwise, from the master key.

During an optional stage S36 of flowchart 30, a parameter key PMK2 of Y2 bits as exemplary illustrated in FIG. 4, where Y2>1, and/or a dummy key DMK2 of Z2 bits as exemplary illustrated in FIG. 4, where Z2>1, are derived from decryption key DEK. As with schryption key SHK2, in practice, the types of techniques in which parameter key PMK2 and dummy key DMK2 can be derived from decryption key DEK are without limit, and is therefore not a limitation as to the scope of stage S36. In one exemplary embodiment, schryption key SHK2 specifies an extraction of parameter key PMK2 and dummy key DMK2 from a master key generated from decryption key DEK.

During a stage S38 of flowchart 30, ciphertext CT is decrypted as defined, at least partially, by schryption key SHK2 to yield a plaintext PT of N bits as exemplary illustrated in FIG. 4, where N>1. If stage S36 was executed prior to stage S38, then parameter key PMK2 serves as a decryption parameter during the decryption of ciphertext CT during stage S38, and/or dummy key DMK2 is inserted within the resulting plaintext PT, which serves as a confidential text message or incorporated as a confidential portion of an otherwise non-confidential text message.

A decryption of the bits of ciphertext CT during stage S38 can be accomplished (1) on a stream basis involving a decryption of each bit of ciphertext CT individually, (2) on a block basis involving individual decryption of bit blocks of ciphertext CT of the same or variable lengths, or (3) one a unit basis involving a collective decryption of all of the bits of ciphertext CT. When decryption of the bits of ciphertext CT during stage S38 is accomplished on a unit basis, which may or may not be specified by schryption key SHK2, then flowchart 30 can be terminated upon completion of stage S38. When decryption of the bits of ciphertext CT during stage S38 is accomplished on a stream or block basis, which may or may not be specified by schryption key SHK2, then flowchart 30 can be either (1) terminated upon completion of stage S38, in which each bit or bit block of ciphertext CT may or may not have been decrypted in accordance with schryption key SHK2, or (2) returned to stage S34 for one or more rounds to thereby derive one or more additional schryption keys for decrypting some or all of the remaining bits or bit blocks of ciphertext CT.

Irrespective of how flowchart 30 is terminated, those having ordinary skill in the art will appreciate the new and unique decryption security obtained in the retrieval of the contents of plaintext PT from ciphertext CT.

Referring to FIG. 5, during a stage S42 of flowchart 40 a text message in the form of a plaintext or a ciphertext, and a user key in the form of a secret key SEK are received. While the text message and the user key in practice can contain any number of bits, for purposes of facilitating an understanding of flowchart 40, text message contains twenty (20) bytes corresponding to "PASSWORD: SCHRYPTION" and secret key SEK is exemplary illustrated in FIG. 6 as containing nine (9) bytes corresponding to "SECRET KEY".

During a stage S44 of flowchart 40, an original master key MSK1 is generated as a function of secret key SEK and a base key BSK. While base key BSK in practice can contain any number of bits, base key BSK is exemplary illustrated in FIG. 6 as containing seven (7) bytes corresponding to "BASE KEY" for purposes of facilitating an understanding of flowchart 40.

In practice, the algorithm for generating master key MSK1 as a function of secret key SEK and base key BSK is without limit, and is therefore not a limitation as to the scope of stage S44. In one exemplary embodiment of stage S44, a matrix of sixteen (16) columns C1-C16, and eight rows R1-R8 is established for master key MSK1 as exemplary illustrated in FIG. 6. To fill out the matrix, the first nine (9) bytes of (C1, R1) to (C9, R1) sequentially contain the nine (9) bytes of secret key SEK. Second, the next nine (9) bytes of (C10, R1) to (C2, R2) sequentially contain a result $S^1$-$Y^1$, respectively, of an XORing of the nine (9) bytes of (C1, R1) to (C9, R1) as a function of base key BSK. Third, the next nine (9) bytes (C3, R2) to (C11, R2) sequentially contain a result $S^2$-$Y^2$, respectively, of an XORing of the nine (9) bytes of (C10, R1) to (C2, R2) as a function of base key BSK. This XORing schemes continues until each byte of the matrix is occupied.

During a stage S46 of flowchart 40, a schryption key SHK3 and a parameter key PMK3 are extracted from master key MSK1 in any manner, including but not limited, a sequential extraction of bytes from master key MSK1 or a non-sequential extraction of bytes from master key MSK1. In practice, the number of bytes of schryption key SHK3 and parameter key PMK3 are without limit, and are therefore not a limitation as to the scope of stage S46. Also, the manner by which schryption key SHK3 and parameter key PMK3 are extracted from master key MSK1 is without limit, and is therefore not a limitation as to the scope of stage S46.

Figure 6:
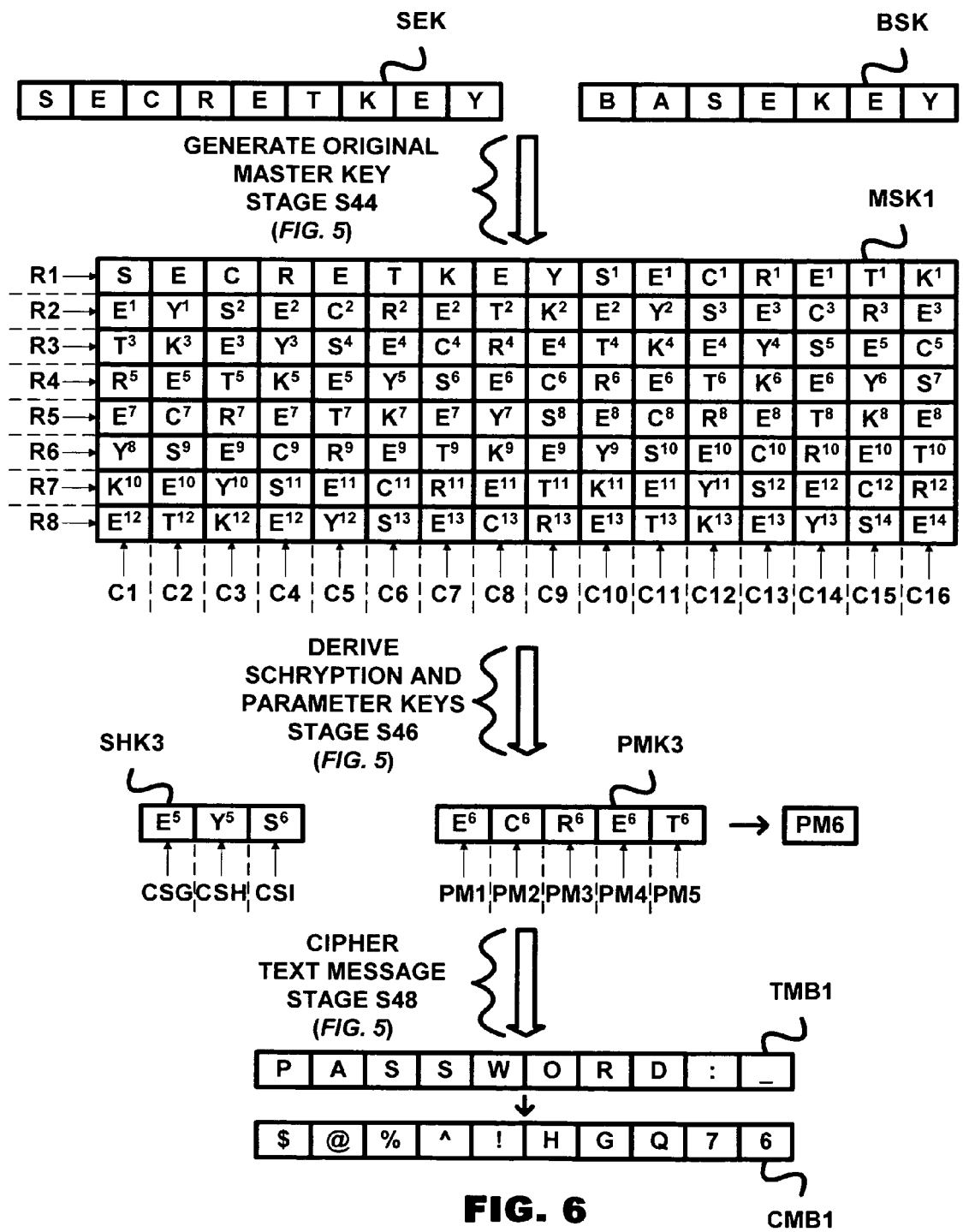
FIGS. 6 and 7 illustrate an exemplary generation of various keys during an execution of the flowchart illustrated in FIG. 5.

In one exemplary embodiment, a row counter (not shown) and a column counter (not shown) are used to indicate the starting position within master key MSK1 for the sequential extraction of schryption key SHK3 and parameter key PMK3. As illustrated in FIG. 6, an exemplary extraction involves a starting position of (C5, R4) whereby the first three (3) bytes of (C5, R4) to (C7, R4) serve as control segments CSG-CSI for schryption key SHK3, and the next five (5) bytes (C18, R4) to (C12, R4) serve as parameter bytes PM1-PM5 for parameter key PMK3.

For flowchart 40, the cryption function is a XOR function whereby control segment CSG specifies the number of bytes of the text message to be ciphered, and control segment CSH specifies the number of times the XOR function is to be executed.

For purposes of facilitating an understanding of flowchart 40, control segment CSG exemplary specifies ten (10) bytes of the text message to be ciphered, which results in text message block TMB1 of "PASSWORD:_" as exemplary illustrated in FIG. 6. Furthermore, parameter bytes PM1-PM5 are processed through a mathematical algorithm to yield a single parameter byte PM6 as exemplary illustrated in FIG. 6.

During a stage S48 of flowchart 40, text message block TMB1 of "PASSWORD:_" is ciphered as defined, in part, by schryption key SHK3 to yield a cipher message CMI. In one exemplary embodiment, parameter byte PM6 is XORed with each byte of text message block TMB1 for a specific number of times as specified by control segment CSH of schryption key SHK3 (e.g., three (3) times) to thereby yield cipher message CMI of "$@%^HGQ76" as exemplary illustrated in FIG. 6.

Figure 7:
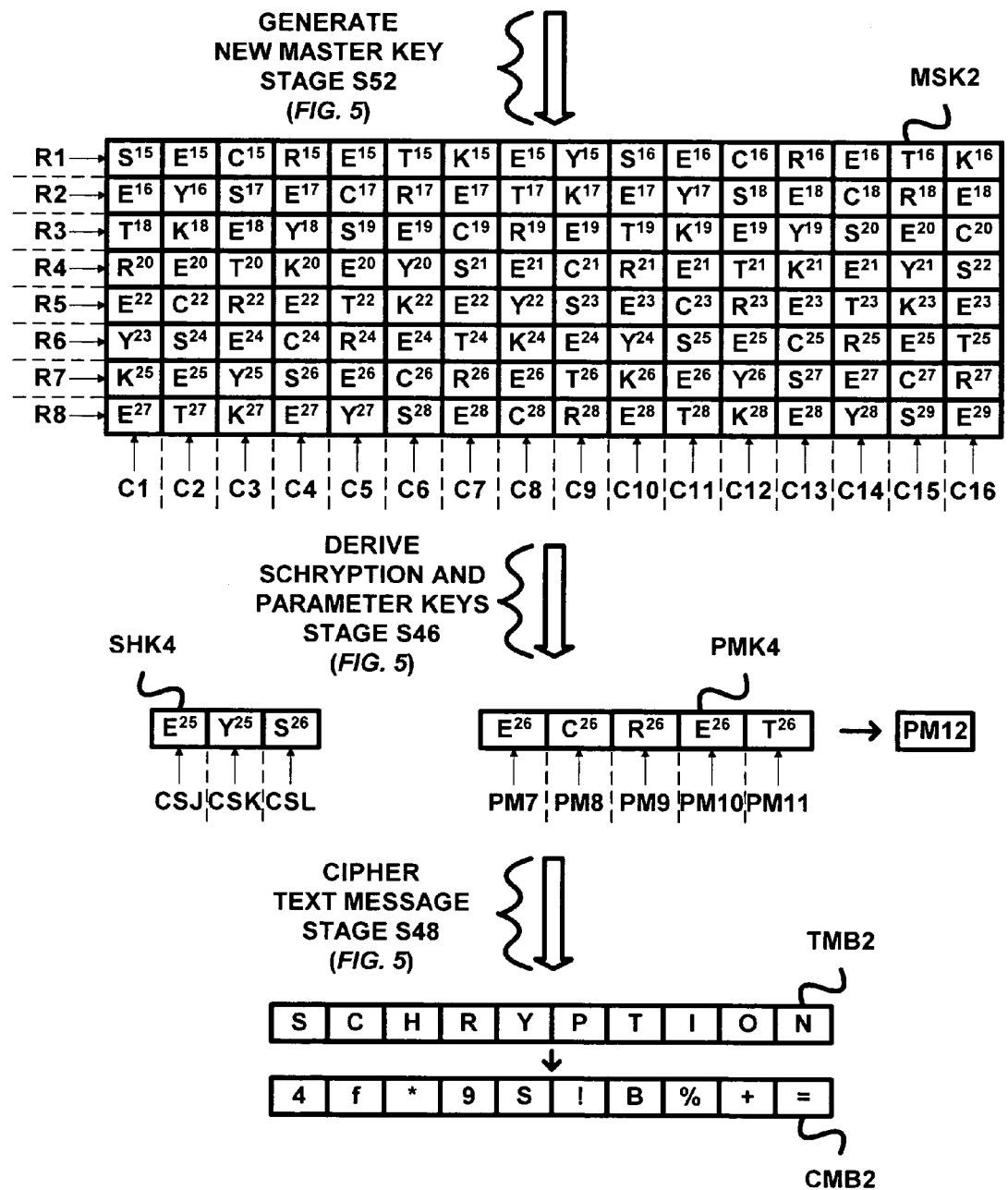

During a stage S50 of flowchart 40, it will be determined that additional bytes "SCHRYPTION" of text message have not been ciphered. Flowchart 40 therefore proceeds to a stage S52 of flowchart 40 to generate a new master key MSK2 as a function of master key MSK1, base key BSK and schryption key SHK3. In practice, the algorithm for generating master key MSK2 as a function of master key MSK1, base key BSK and schryption key SHK3 is without limit, and is therefore not a limitation as to the scope of stage S52. In one exemplary embodiment of stage S52, each byte of master key MSK1 is XORed with base key BSK for a specific number of times as specified by control segment CSI of schryption key SHK3 to thereby yield master key MSK2 as exemplary illustrated in FIG. 7.

Upon returning to stage S46, a schryption key SHK4 and a parameter key PMK4 are extracted from master key MSK2 in any manner, including but not limited, a sequential extraction of bytes from master key MSK1 or a non-sequential extraction of bytes from master key MSK1. In practice, the number of bytes of schryption key SHK4 and parameter key PMK4 are without limit, and are therefore not a limitation as to the scope of stage S46. Also, the manner by which schryption key SHK4 and parameter key PMK4 are extracted from master key MSK2 is without limit, and is therefore not a limitation as to the scope of stage S46.

In one exemplary embodiment, the row counter (not shown) and the column counter (not shown) are incremented to indicate the starting position within master key MSK2 for the sequential extraction of schryption key SHK4 and parameter key PMK4. As illustrated in FIG. 6, an exemplary extraction involves a starting position of (C5, R7) whereby the first three (3) bytes of (C5, R7) to (C7, R7) serves as control segments CSJ-CSL for schryption key SHK4 and the next five (5) bytes of (C8, R7) to (C12, R7) serve as parameter bytes PM7-PM11 for parameter key PMK4.

For flowchart 40, the cryption function is a XOR function whereby control segment CSJ specifies the number of bytes of the text message to be ciphered, and control segment CSK specifies the number of times the XOR function is to be executed. For purposes of facilitating an understanding of flowchart 40, control segment CSJ exemplary specifies ten (10) byes of the text message to be ciphered, which results in text message block TMB2 of "SCHRYPTION" as exemplary illustrated in FIG. 7. Furthermore, parameter bytes PM7-PM11 are processed through a mathematical algorithm to yield a single parameter byte PM12 as exemplary illustrated in FIG. 7.

During stage S48, text message block TMB2 of "SCHRYPTION" is ciphered as defined, in part, by schryption key SHK4 to yield a cipher message block CMB2. In one exemplary embodiment, parameter byte PM12 is XORed with each byte of text message block TMB2 for a specific number of times as specified by control segment CSK of schryption key SHK4 (e.g., three (3) times) to thereby yield cipher message block CMB2 of "4f*9S!B %+=" as exemplary illustrated in FIG. 7.

During a stage S50 of flowchart 40, it will be determined that there are no additional bytes of the text message to cipher, and flowchart 40 is therefore terminated whereby cipher message blocks CMB1 and CMB2 are combined to yield a cipher message "$@%^!HGQ764f*9S!B %+=". Those having ordinary skill in the art will appreciate that a sequent and identical execution of flowchart 40 on cipher message "$@%^!HGQ764f*9S!B %+=" will yield text message "PASSWORD: SCHRYPTION". Those having ordinary skill in the art will therefore further appreciate, from an execution of flowchart 40, the new and unique encryption security obtained in the concealment of text message "PASSWORD: SCHRYPTION" within cipher message "$@%^!HGQ764f*9S!B %+=", and new and unique description security obtained in the retrieval of text message "PASSWORD: SCHRYPTION" from cipher message "$@%^!HGQ764f*9S!B %+=".

The description of flowchart 40 herein in the context of ciphering "PASSWORD: SCHRYPTION" was given to facilitate an understanding of a total schryption method of the present invention. In practice, the sequence of stages S44-S52 of flowchart 40 can be implemented under different schemes for ciphering "PASSWORD: SCHRYPTION".

Furthermore, those of ordinary skill in the art will appreciate that, in practice, a structural implementation of flowcharts 20, 30 and 40 will vary depending on the specific implementation of a device or system embodying the present invention. Thus, the variety of hardware platforms and software environments for structurally implementing flowcharts 20, 30 and 40 is without limit.

Figure 8:
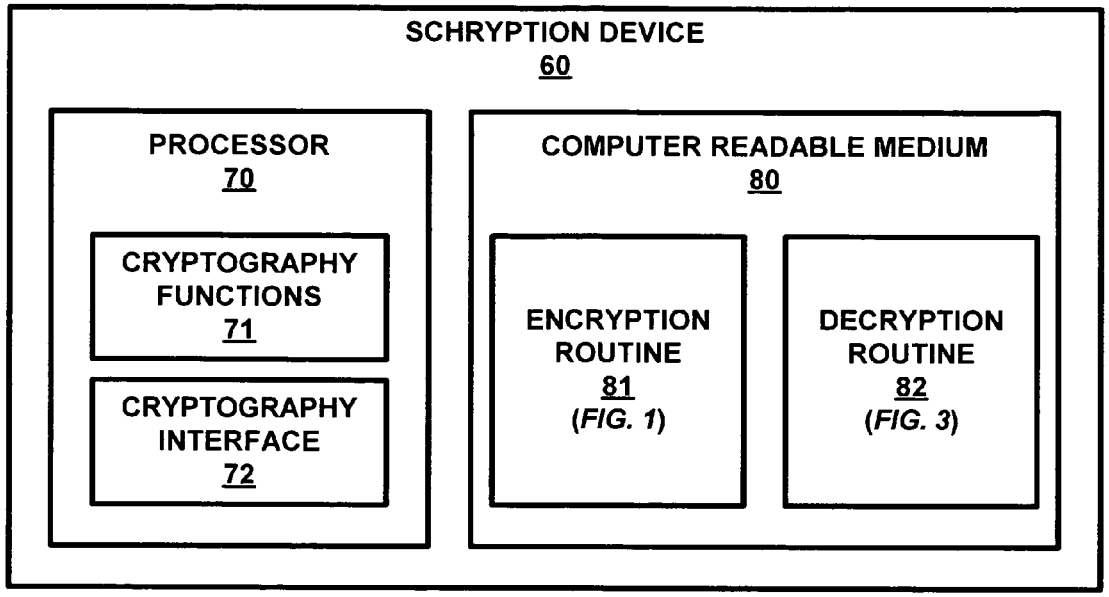
FIG. 8 illustrates a schryption device in accordance with a first embodiment of the present invention.

In one exemplary embodiment, a schryption device 60 as illustrated in FIG. 8 employs a conventional processor 70 having cryptography functions 71 (e.g., Boolean functions) and a cryptograph interface 72 for controlling a retrieval of cryptography functions from an external source. Schryption device 60 further employs a conventional computer readable medium 80 (e.g., a ROM, hard drive, etc.) for storing computer instructions in an encryption routine 81 programmed, conventional or otherwise, in accordance with flowchart 20 (FIG. 1), and for storing computer instructions in an encryption routine 82 programmed, conventional or otherwise, in accordance with flowchart 30 (FIG. 3). As such, processor 70 can be operated to execute a conventional operating system to control program execution of the computer instructions of routines 81 and 82 as needed.

Figure 9:
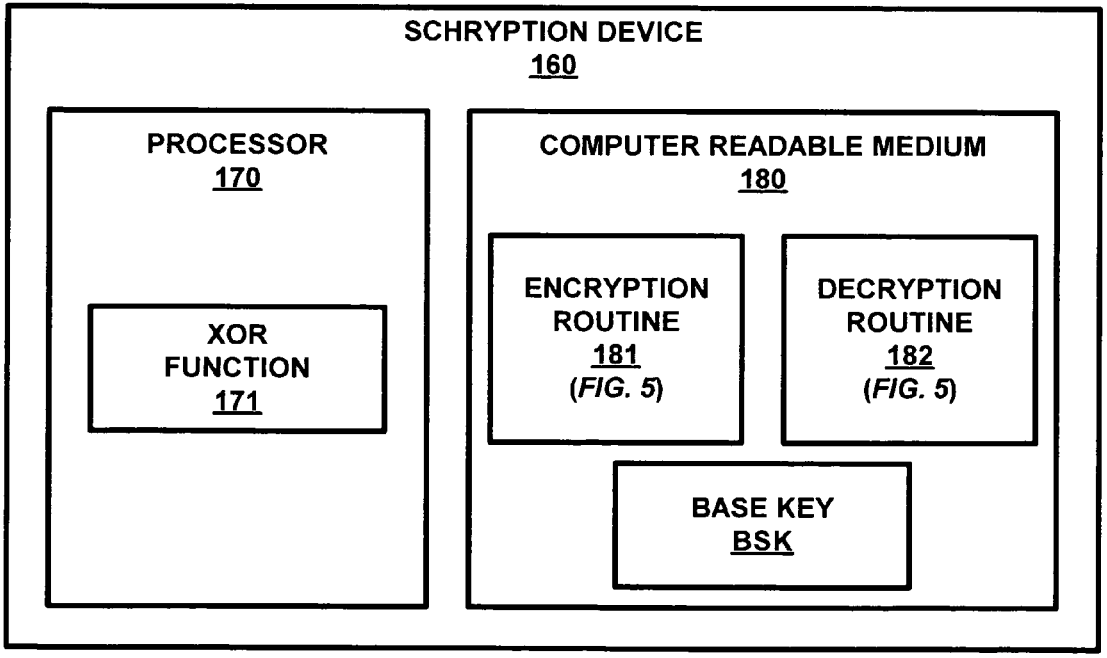
FIG. 9 illustrates a schryption device in accordance with a second embodiment of the present invention.

In a second exemplary embodiment, a schryption device 160 as illustrated in FIG. 9 employs a conventional processor 170 having an XOR function 171. Schryption device 160 further employs a conventional computer readable medium 180 (e.g., a ROM, hard drive, etc.) for storing computer instructions in an encryption routine 181 programmed, conventional or otherwise, in accordance with flowchart 40 (FIG. 5), for storing computer instructions in a decryption routine 182 programmed, conventional or otherwise, in accordance with flowchart 40 (FIG. 5), and for storing base key BSK. As such, processor 170 can be operated to execute a conventional operating system to control program execution of the computer instructions of routines 181 and 182 as needed.

Those having ordinary skill in the art will appreciate the various nodal incorporations of a schryption device (e.g., device 60 illustrated in FIG. 8 and device 160 illustrated in FIG. 9) within a network environment. For example, as illustrated in FIG. 10, device 60 can be incorporated within various networks and devices connected to an internet 100 where the processor of the schryption device can serves a primary or an auxiliary processor.

For a network 90, device 60 can either be incorporated within a firewall of network 90, a gateway server of network 90, and/or individual workstations of network 90. For a printer 91 and a fax 92, device 60 can either be incorporated in printer 91 and fax 92, and/or serve to connect printer 91 and fax 92 to internet 100.

For a network 93, device 60 can either be incorporated within a router connecting network 93 to internet 100, a repeater of network 93, and/or individual workstations of network 93. For a network 94, device 60 can either be incorporated within a PSTN of network 94, a mobile phone of network 94, and/or a telephone of network 94. For a network 95, device 60 can either be incorporated within the router connecting network 95 to internet 100, a gateway server of network 95, and/or individual workstations of network 95.

Figure 10:
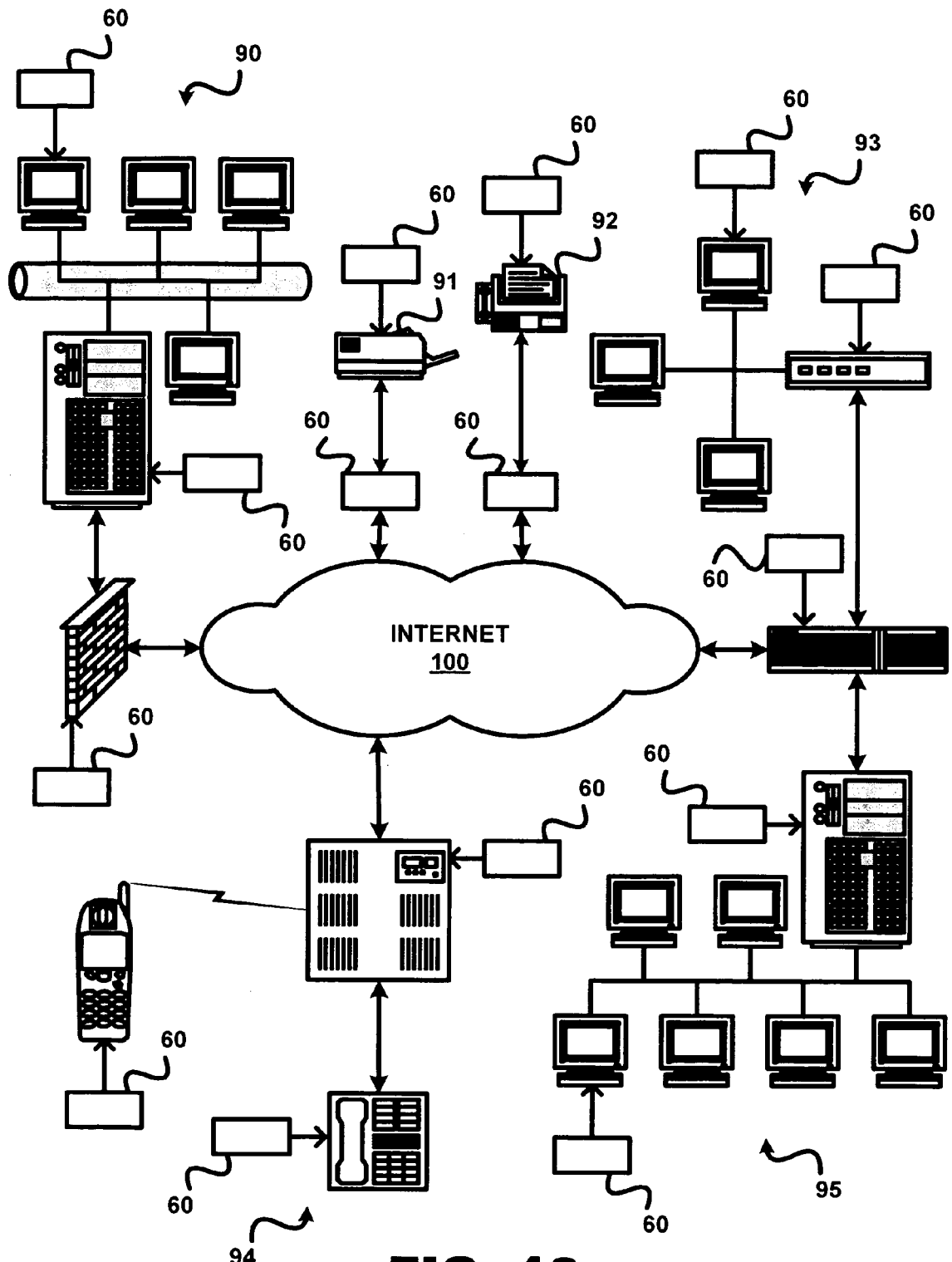
FIG. 10 illustrates an exemplary network incorporating the schryption device illustrated in FIG. 8.

From the FIG. 10, those having ordinary skill in the art will appreciate the varied manner by which a schryption device of the present invention may be utilized to provide encryption and decryption security to devices and networks.

While the embodiments of the present invention disclosed herein are presently considered to be preferred embodiments, various changes and modifications can be made without departing from the spirit and scope of the present invention. The scope of the invention is indicated in the appended claims, and all changes that come within the meaning and range of equivalents are intended to be embraced therein.

I claim:

1. A method of encrypting a text message, the method comprising:
   receiving a text message and a secret key;
   converting the text message into at least one text message block;
   generating a first master key as a function of the secret key and a base key;
   wherein generating the first master key comprises:
      establishing a matrix of C columns, wherein C is an integer greater than or equal to 1 and R rows wherein R is an integer greater than or equal to 1;
      filling the first B bytes of the matrix with the first B bytes of the secret key, wherein B is an integer greater than or equal to 1;
      determining whether the matrix is fully occupied based on the filling of the first B bytes;
      filling, based on the determination, the second B bytes with an XORing of the first B bytes as a function of the base key;
      determining whether the matrix is fully occupied based on the filling of the second B bytes;
      filling, based on the determination, the third B bytes with an XORing of the second B bytes as a function of the base key
      extracting a schryption key and a parameter key from the master key;

ciphering at least one text message block as specified by the schryption key to yield a cipher message block;

determining whether the ciphered text message block leaves any text message blocks un-ciphered;

generating a new master key based on the determination, the new master key generated as a function of the first master, base key and schryption key; and encrypting the text message based on at least the first master key and new master key.

2. The method of claim 1 wherein C=16, R=8, and B=9.

3. The method of claim 1 wherein C=2R, and wherein B=1+C/2.

* * * * *